US007832663B1

(12) United States Patent
Cotham

(10) Patent No.: US 7,832,663 B1
(45) Date of Patent: Nov. 16, 2010

(54) BACKPACK FEEDER

(76) Inventor: Leon David Cotham, 1722 Daly, Corpus Christi, TX (US) 78412

( * ) Notice: Subject to any disclaimer, the term of this patent is extended or adjusted under 35 U.S.C. 154(b) by 848 days.

(21) Appl. No.: 11/518,086

(22) Filed: Sep. 8, 2006

Related U.S. Application Data

(60) Provisional application No. 60/596,241, filed on Sep. 9, 2005.

(51) Int. Cl.
*B05B 1/14* (2006.01)
(52) U.S. Cl. .................. 239/653; 239/661; 239/650; 239/664; 239/153; 239/152; 224/645; 224/650; 224/576
(58) Field of Classification Search .......... 224/650, 224/645, 644, 576; 239/653, 661, 668, 650, 239/664, 152, 153, 154
See application file for complete search history.

(56) References Cited

U.S. PATENT DOCUMENTS

| 260,373 | A | | 7/1882 | Erwin | |
|---|---|---|---|---|---|
| 337,312 | A | | 3/1886 | Dodds et al. | |
| 454,117 | A | | 6/1891 | Myers | |
| 935,734 | A | * | 10/1909 | Bessen | 239/689 |
| 967,096 | A | | 8/1910 | Wood | |
| 1,166,476 | A | * | 1/1916 | Parrish | 239/665 |
| 1,793,197 | A | | 12/1929 | Speicher | |
| 2,239,464 | A | | 2/1939 | Moger | |
| 2,192,256 | A | * | 3/1940 | Brandt | 222/245 |
| 2,232,571 | A | | 8/1940 | Stark | |
| 2,221,113 | A | * | 11/1940 | Schmitt | 239/652 |
| 2,599,118 | A | | 1/1950 | McMillan | |
| 2,740,230 | A | * | 4/1956 | Clapper | 239/654 |
| 2,919,169 | A | * | 12/1959 | Jackson | 312/235.2 |
| 3,040,471 | A | * | 6/1962 | Blase | 239/653 |
| 3,223,286 | A | * | 12/1965 | Sawyer | 239/654 |
| 3,586,238 | A | * | 6/1971 | Schmierer et al. | 239/153 |
| 3,856,211 | A | | 12/1974 | Williams | |
| 4,157,150 | A | | 6/1979 | Hetrick | |
| 5,267,371 | A | * | 12/1993 | Soler et al. | 15/327.5 |

(Continued)

FOREIGN PATENT DOCUMENTS

DE 3819715 1/1989

(Continued)

OTHER PUBLICATIONS 2005 (e) Document comparing ATV mounted feeders and a hand-cranked seed spreader.

(Continued)

*Primary Examiner*—Len Tran
*Assistant Examiner*—Trevor E McGraw
(74) *Attorney, Agent, or Firm*—George S. Gray

(57) ABSTRACT

A portable game feeder backpack that is worn by the user to spread feed for wild game or other granular material, e.g. seed, grain, or fertilizer. The invention provides a bucket mounted on a tubular frame. A funnel and a downspout direct granular material to a motorized spreader plate mounted below the bucket. A handheld switch remotely activates the motor. The device is worn as a backpack and has two removable padded shoulder straps. A detachable bracket allows the device to be attached to the rear structure on a vehicle, e.g. an all terrain vehicle or pickup. The device also can be used as a swiveling hunting seat having a padded cover on the lid of the bucket.

19 Claims, 15 Drawing Sheets

U.S. PATENT DOCUMENTS

| | | | |
|---|---|---|---|
| 5,339,994 A | 8/1994 | Nuila | |
| 5,409,166 A | 4/1995 | Gunzel et al. | |
| 5,447,272 A * | 9/1995 | Ask | 239/7 |
| 5,503,090 A * | 4/1996 | Guzan | 111/7.2 |
| 6,055,975 A | 5/2000 | Gallagher et al. | |
| 6,089,477 A * | 7/2000 | Dillon | 239/653 |
| 6,425,500 B2 | 7/2002 | McNally | |
| 6,575,695 B1 * | 6/2003 | Miyamoto | 415/119 |
| 6,729,558 B1 * | 5/2004 | Seenauth | 239/152 |
| 6,938,761 B2 * | 9/2005 | Nish | 206/315.11 |
| 2002/0175222 A1 * | 11/2002 | Vaage | 239/153 |
| 2004/0031864 A1 | 2/2004 | Johnston | |
| 2005/0011785 A1 * | 1/2005 | Nish | 206/315.1 |
| 2005/0133560 A1 * | 6/2005 | Taylor | 224/630 |
| 2006/0113147 A1 * | 6/2006 | Harris, Jr. | 182/3 |
| 2006/0207513 A1 | 9/2006 | Carroll | |
| 2007/0034710 A1 * | 2/2007 | Elrod et al. | 239/146 |

FOREIGN PATENT DOCUMENTS

JP     2056262     2/1990

OTHER PUBLICATIONS 2005 (e) Photos of an adjustable spout.

\* cited by examiner

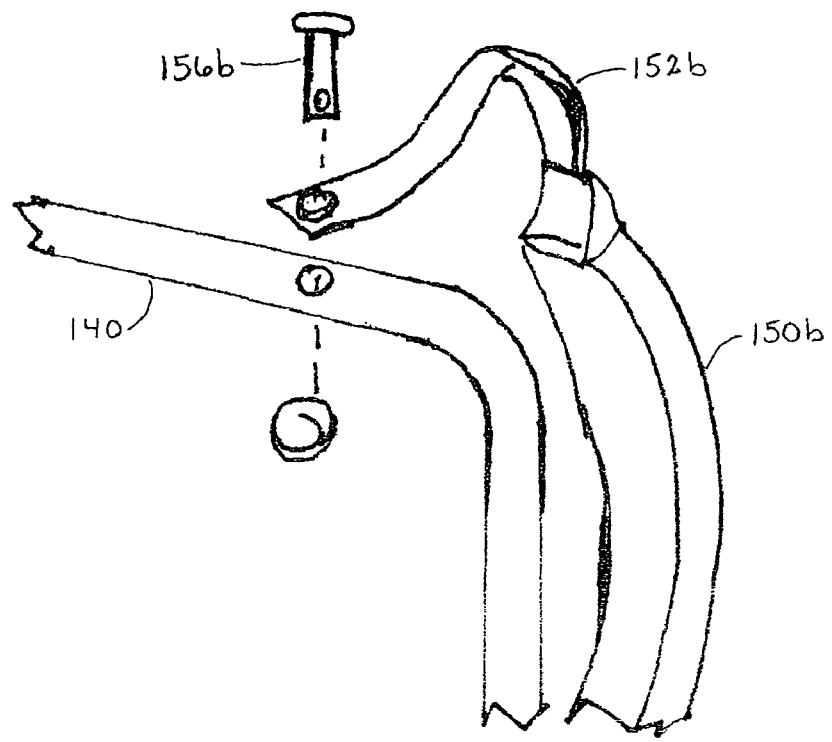
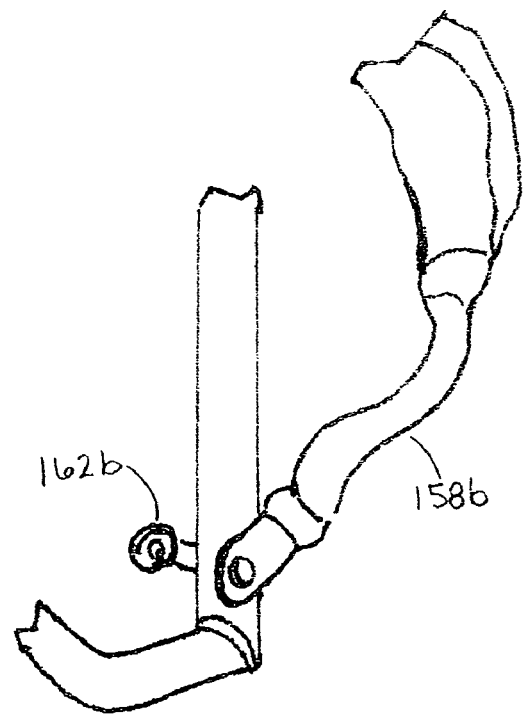
Fig. 9

BACKPACK FEEDER

CROSS-REFERENCE TO PRIOR APPLICATION

This application claims priority from U.S. Provisional Patent Application Ser. No. 60/596,241, filed Sep. 9, 2005, the inventor being Leon David Cotham.

BACKGROUND OF THE INVENTION

1. Field of the Invention

This invention relates generally to dispersing granular material, e.g. feed, seed, grain and fertilizer, and more particularly to dispersing granular material from a portable device configured as a backpack.

2. Background

Hunters use feeders to attract game. Usually these are stationary and near a stand. Hunters then wait for game to come to the feeder. Some dedicated feeders are available for vehicles, e.g. all terrain vehicles, to feed larger areas like roads. During hunting season older more mature animals shy away from stationary feeders, or visit them at night. Today's hunters are taking an increased interest and active approach to deer management, and more and more hunters are learning the benefits of feeding and planting food plots to attract and hold more deer on their property.

The prior art includes a variety of devices for dispersing granular seed, feed, grain and fertilizer. Some prior art devices are adapted for carrying on the user's back. No prior art devices include a device adapted for carrying on the user's back, that also includes a remotely-actuated, motorized, spinning spreader plate.

Additionally, although some devices for dispersing granular material are adapted for attachment to a moving vehicle, no such prior art devices are adapted for removal from the vehicle and carrying on the user's back in a terrain deemed unsuitable for the vehicle.

Similarly, although some devices for dispersing granular material are adapted for suspension from overhanging objects, e.g. tree branches, no such prior art devices are known to be remotely actuated, nor or such devices adapted for alternating between using the device in such a suspended manner, and carrying on the user's back to areas remote from the area of suspension, where no overhead object is available.

Also, no prior art devices for dispersing granular material are adapted to provide an appropriately elevated seating platform for the user after removing the device from the user's shoulders.

What is needed is a device for dispersing granular seed, feed, and fertilizer, which is transportable on the user's back, has a motorized, spinning spreader plate that is remotely actuated, provides a seating platform for the user, is adaptable for attachment to rear structure on a vehicle, and can be suspended above the ground from an overhead object and remotely actuated.

SUMMARY OF THE INVENTION

The present invention overcomes the shortcomings of the prior art by providing a device for dispersing granular seed, feed, and fertilizer, which is transportable on the user's back, has a motorized, spinning spreader plate that is remotely actuated, provides a swiveling, cushioned seating platform for the user, is readily adaptable for attachment to rear structure on a vehicle, e.g. an all terrain vehicle or a pickup, and can readily be suspended above the ground from an overhead object and remotely actuated.

I have provided a portable game feeder backpack that is worn by the user to spread feed for wild game, and can also be used to spread seed and fertilizer. The device comprises a bucket with a removable lid that is filled with granular material, a funnel arranged within and at the bottom of the bucket, a downspout assembly beneath the funnel, and a motorized spreader plate beneath the downspout assembly that receives granular material from the funnel and scatters granular material behind the user as the user walks through a forest or hunting area that is inaccessible to vehicles. A push button activation switch is arranged at the end of an elastic cord to the motor that powers the spreader plate. The entire assembly is mounted to a backpack frame that has two padded shoulder straps, a padded belt, and a lower back cushion. The device may be placed on the ground so that the padded lid of the bucket may serve as a hunting seat for the user. The invention also has a detachable bracket made from square aluminum that may be attached to the rack of a vehicle, e.g. an all terrain vehicle, (ATV) for transportation or for use in spreading granular material behind the vehicle. The device is easily attached and detached from the bracket by two or more bolts and wing nuts and secured with nylon buckle straps.

Advantages of my invention include the ability to enter areas inaccessible by vehicle and to enter without noise and disruption. Hunters may scout bedding areas and travel lanes used by game. The device is then used to spread feed or plant food plots, to attract and hold game. The unit doubles as a hunting seat. The "backpack feeder" allows the hunter to go where these mature animals spend time and spread feed or plant food plots to hold the animals and then set up a stand. This is especially attractive for bow hunters. My invention allows hunters with smaller tracts of land to reap the same benefits from feeding and planting food plots as the larger landholders.

The bucket is filled with granular material and then the user activates the spreader motor with the hand held switch causing the spreader plate to distribute the granular material either as a backpack or from the ATV. The components work together to hold the granular material, distribute the granular material to a spreader plate and then spread the granular material behind the user as a backpack or behind the invention mounted to a vehicle. My invention is used to spread granular material in order to attract and hold wild game in areas inaccessible to vehicles when used as a backpack or over large areas such as roads when used on the ATV.

In some exemplary embodiments, I have provided an apparatus for a user to disperse granular material, comprising: a bucket for receiving and storing the granular material, the bucket having a bottom, the bucket bottom having a hole through which granular material is gravity discharged; a downspout assembly, for directing the granular material discharged from the bucket; a spreader assembly attached to the bucket, the spreader assembly having a spreader plate positioned to receive granular material from the downspout assembly second conduit lower end, a motor configured to receive power from an electric power source, a power source positioning member, a driving member connecting the motor and the spreader plate, and an actuator, operated by the user's hand, for activating and de-activating the motor such that the activated motor rotates the spreader plate and granular material is dispersed, the downspout assembly second conduit lower end being spaceable with respect to the spreader plate; a frame having a platform for supporting the bucket, and a brace member; and a harness for receiving and supporting the frame, the harness having straps such that the user supports the apparatus upon the user's back.

In some exemplary embodiments, the frame further comprises an enclosure, the enclosure substantially enclosing the spreader assembly.

In some exemplary embodiments, the downspout assembly further comprises a first conduit and a second conduit, the second conduit having a lower end, the first and second conduits being adjustable along a portion of their respective lengths such that the second conduit lower end is positionable at or between a first and second position.

In some exemplary embodiments, the bucket has a removable lid for securing the stored granular material within the bucket.

In some exemplary embodiments, the lid has a top member, the top member useable as a seat by the user, the frame serving as a support for the seat.

In some exemplary embodiments, the top member is padded.

In some exemplary embodiments, the top member swivels with respect to the lid. In some exemplary embodiments, the frame is sized such that the lid top member is spaced between two and three feet from the ground, when the frame rests upon the ground.

In some exemplary embodiments, the actuator is remotely utilized by the user.

In some exemplary embodiments, the actuator further comprises a hand control and an electric cord connecting the hand control to the motor.

In some exemplary embodiments, the spreader assembly actuator further comprises a wireless hand-operated hand control.

In some exemplary embodiments, the harness further comprises a belt member, the belt member being attached to the frame brace such that the user may secure the belt member about the user's waist.

In some exemplary embodiments, the frame brace member has a padded member placed on the frame such that the padded support is proximate the user's neck.

In some exemplary embodiments, the frame brace member has a padded member placed on the frame such that the padded support is proximate the user's lower back.

In some exemplary embodiments, the frame is configured and sized such that the height of the frame is less than 36 inches.

In some exemplary embodiments, the frame is configured and sized such that the width of the frame is less than 25 inches.

In some exemplary embodiments, the frame is configured and sized such that the depth of the frame is less than 25 inches.

In some exemplary embodiments, the harness is constructed from weather-resistant material.

In some exemplary embodiments, the harness is constructed from camouflaged material.

In some exemplary embodiments, the apparatus further comprises an attachment assembly for removably attaching the frame to a rear structure on a vehicle, such that, in response to the user's operation of the motor actuator, some of the granular material is dispersed behind the vehicle as the vehicle is in forward motion.

In some exemplary embodiments, the attachment assembly is configured such that the frame is attachable to the vehicle rear structure such that substantially all the frame is positioned behind the rear structure.

In some exemplary embodiments, the vehicle rear structure is a receiver hitch and the attachment assembly comprises an insertion member for inserting and securing within the receiver hitch, the insert member having an elevated, transverse member and at least two elongated members extending from the transverse member, the frame being attachable to the two elongated members.

In some exemplary embodiments, the vehicle rear structure is a rear rack having tubular portions and the attachment assembly comprises at least two elongated members and attachment mechanisms for attaching the elongated members to the tubular portions, the attachment assembly further comprising attachment mechanisms for attaching the frame to the elongated members.

In some exemplary embodiments, the bucket has handle structure and the apparatus further comprises a suspension assembly for suspending the apparatus above the ground from an elevated object, the suspension assembly having pulley and a securing device for hanging the pulley on the elevated object, a rope having a first end and a second end, the rope positioned for travel through the pulley, a hanger having at least two end members, the end members being configured to engage the bucket handle structure when the hanger moves vertically, and a hanger securing device positioned on the rope first end for attaching the rope to the hanger, such that the user, when pulling on the rope second end, causes the hanger securing device to lift the hanger, the hanger end members engaging the bucket handle structure such that the apparatus is elevated.

In some exemplary embodiments of my invention, I have provided an apparatus for a user to disperse granular material, comprising: means for receiving, storing and discharging the granular material; means for directing the granular material discharged from the bucket; means for dispersing the granular material; means for supporting the means for receiving, storing and discharging the granular material, and for substantially enclosing the spreader assembly; and means for carrying the apparatus upon the user's back.

In some exemplary embodiments the apparatus further comprises means for closing the means for receiving, storing and discharging the granular material, the means for closing further comprising means for supporting the user in a seated position.

In some exemplary embodiments the apparatus further comprises means for the user to swivel while seated on the means for supporting the user in a seated position.

In some exemplary embodiments the apparatus further comprises means for remotely actuating the means for dispersing.

In some exemplary embodiments the means for supporting the apparatus further comprises means for securing the apparatus about the user's waist.

In some exemplary embodiments the apparatus further comprises means for removably attaching the frame to a rear structure on a vehicle, such that, in response to the user's operation of the means for dispersing, some of the granular material is dispersed behind the vehicle while the vehicle is in forward motion.

In some exemplary embodiments the apparatus further comprises means for removably suspending the apparatus from an elevated structure.

In some exemplary embodiments of my invention, I have provided an apparatus for a user to disperse granular material, comprising: a bucket for receiving and storing the granular material, the bucket having a bottom, the bucket bottom having a hole through which granular material is gravity discharged, the bucket further having a removable lid for securing the stored granular material within the bucket, the lid having a padded top member the top member being useable as a seat by the user, the frame serving as a support for the seat member, the top member swiveling with respect to the lid; a downspout assembly, for directing the granular material discharged from the bucket, the downspout assembly further comprising a first conduit and a second conduit, the second conduit having a lower end, the first and second conduits being adjustable along a portion of their respective lengths such that the second conduit lower end is positionable at or between a first and second position; a spreader assembly attached to the bucket, the spreader assembly having a spreader plate positioned to receive granular material from the downspout assembly second conduit lower end, a motor configured to receive power from an electric power source, a power source positioning member, a driving member connecting the motor and the spreader plate, and an actuator, operated by the user's hand, for activating and de-activating the motor such that the activated motor rotates the spreader plate and granular material is dispersed, the downspout assembly second conduit lower end being spaceable with respect to the spreader plate; a frame having a platform for supporting the bucket, and a brace member, the frame being configured and sized such that the height of the frame is less than 36 inches, the frame brace member having a padded member placed on the frame brace member such that the padded support is proximate the user's lower back, the frame further comprising an enclosure, the enclosure substantially enclosing the spreader assembly; and a harness for receiving and supporting the frame, the harness having straps such that the user supports the apparatus upon the user's back, the harness further comprising a belt member, the belt member being attached to the frame brace such that the user may secure the belt member about the user's waist.

The foregoing features and advantages of my invention will be apparent from the following more particular descriptions of exemplary embodiments of the invention as illustrated, in some embodiments, in the accompanying drawings.

BRIEF DESCRIPTION OF DRAWINGS

FIG. 9 is a partial view of a shoulder strap, frame brace and attachments in an exemplary embodiment of the present invention.

DETAILED DESCRIPTION OF EXEMPLARY EMBODIMENTS

The following discussion describes exemplary embodiments of the invention in detail. This discussion should not be construed, however, as limiting the invention to those particular embodiments. Practitioners skilled in the art will recognize numerous other embodiments as well. For a definition of the complete scope of the invention, the reader is directed to the appended claims.

As used herein the term "granular material" includes feed, seed, grain, and fertilizer.

Figure 1:
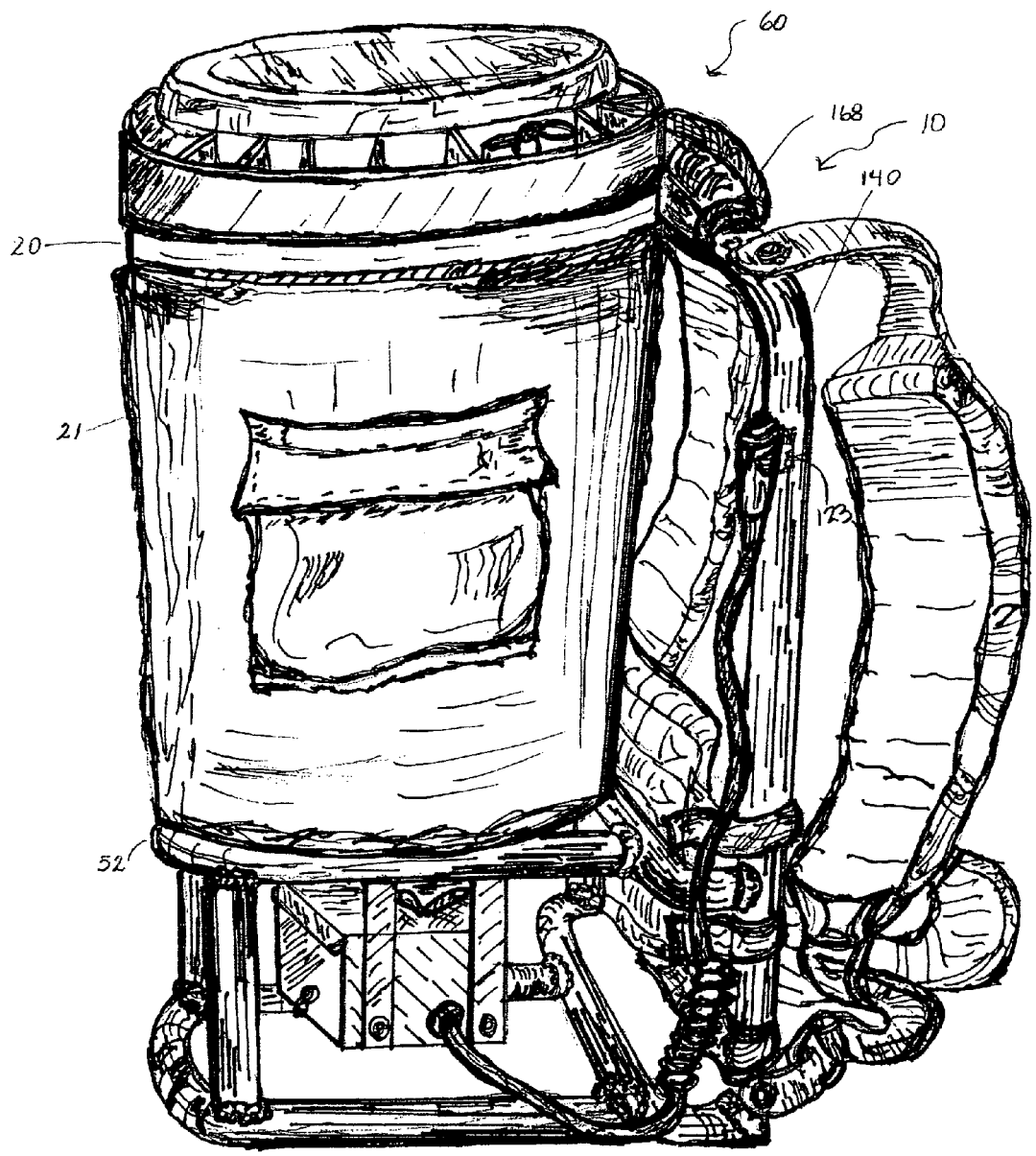
FIG. 1 is a perspective view of an exemplary embodiment of the present invention.
Figure 3:
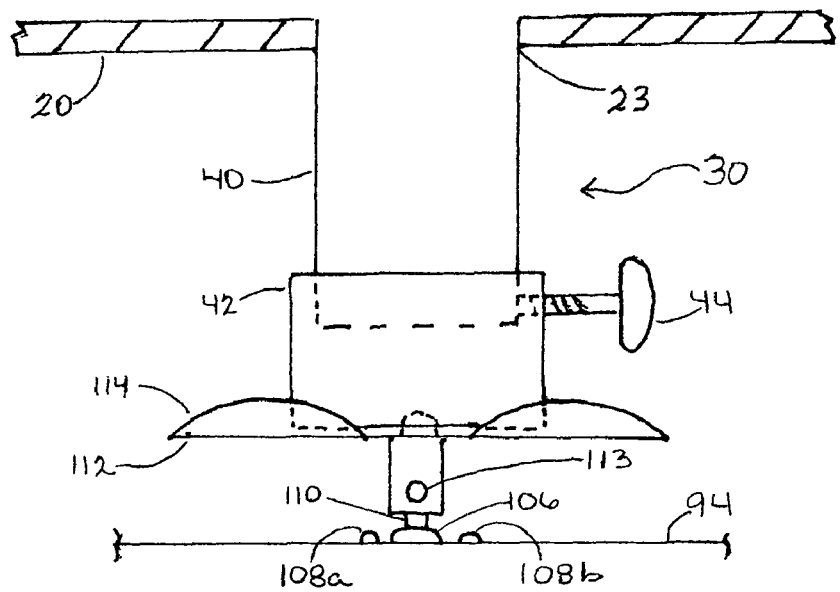
FIG. 3 is a front view of the downspout assembly in a first position in an exemplary embodiment of the present invention.
Figure 4:
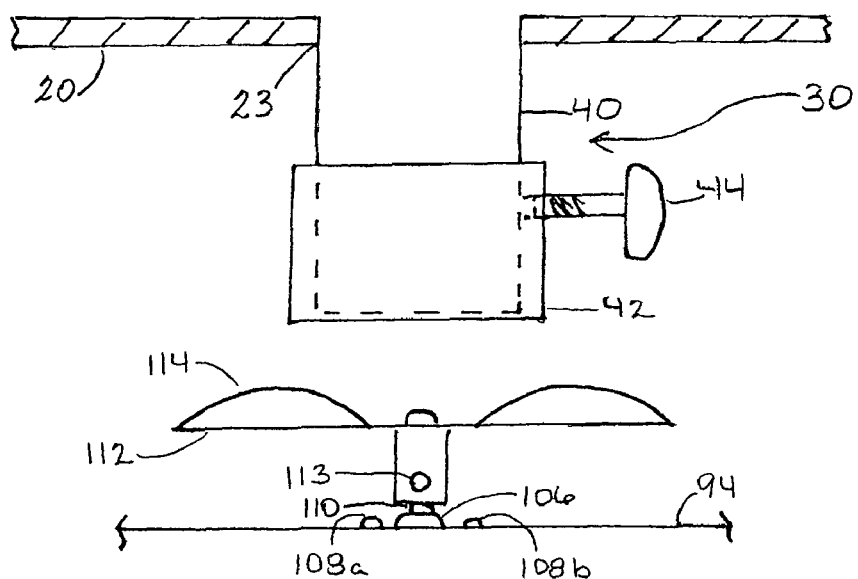
FIG. 4 is a front view of the downspout assembly in a second position in an exemplary embodiment of the present invention.

Turning now to FIG. 1, an exemplary embodiment 10 of the present invention is illustrated. As illustrated further in FIG. 2, an exemplary embodiment 10 is shown by which a user can disperse granular material stored in a bucket 20, having a camouflaged fabric cover 21 and a threaded top 22, an interior funnel 24, attached within the bucket fasteners 26a-d, with rivets 27a-d attaching the fasteners to the bucket, and rivets 29a-d attaching the fasteners to the funnel, the funnel having a hole 28 at the bottom 34 of the bucket, coinciding with a hole 23 in the bucket bottom (as illustrated in FIG. 3). As part of a downspout assembly 30, a plate 32 is within the bucket 22 at the bottom, the plate having a hole 36 at which a first conduit 40 is fixed and extends downwardly such that granular material within the bucket may pass through the funnel hole 28, the plate 32, the bucket bottom hole 23, and the first conduit 40. The downspout assembly includes a second conduit 42 which telescopes on the first conduit 40 and is fixable at various positions with relation to the first conduit using set screw 44, which screws into the second conduit and bears against the first conduit. As illustrated for an exemplary embodiment in FIG. 3 and FIG. 4, the second conduit 42 is positionable in a lowered position and raised position, respectfully.

In some exemplary embodiments (not shown) the first conduit is attached to the funnel instead of the plate 32, and in some exemplary embodiments the first conduit is an extension of the funnel through the plate 32.

Figure 2:
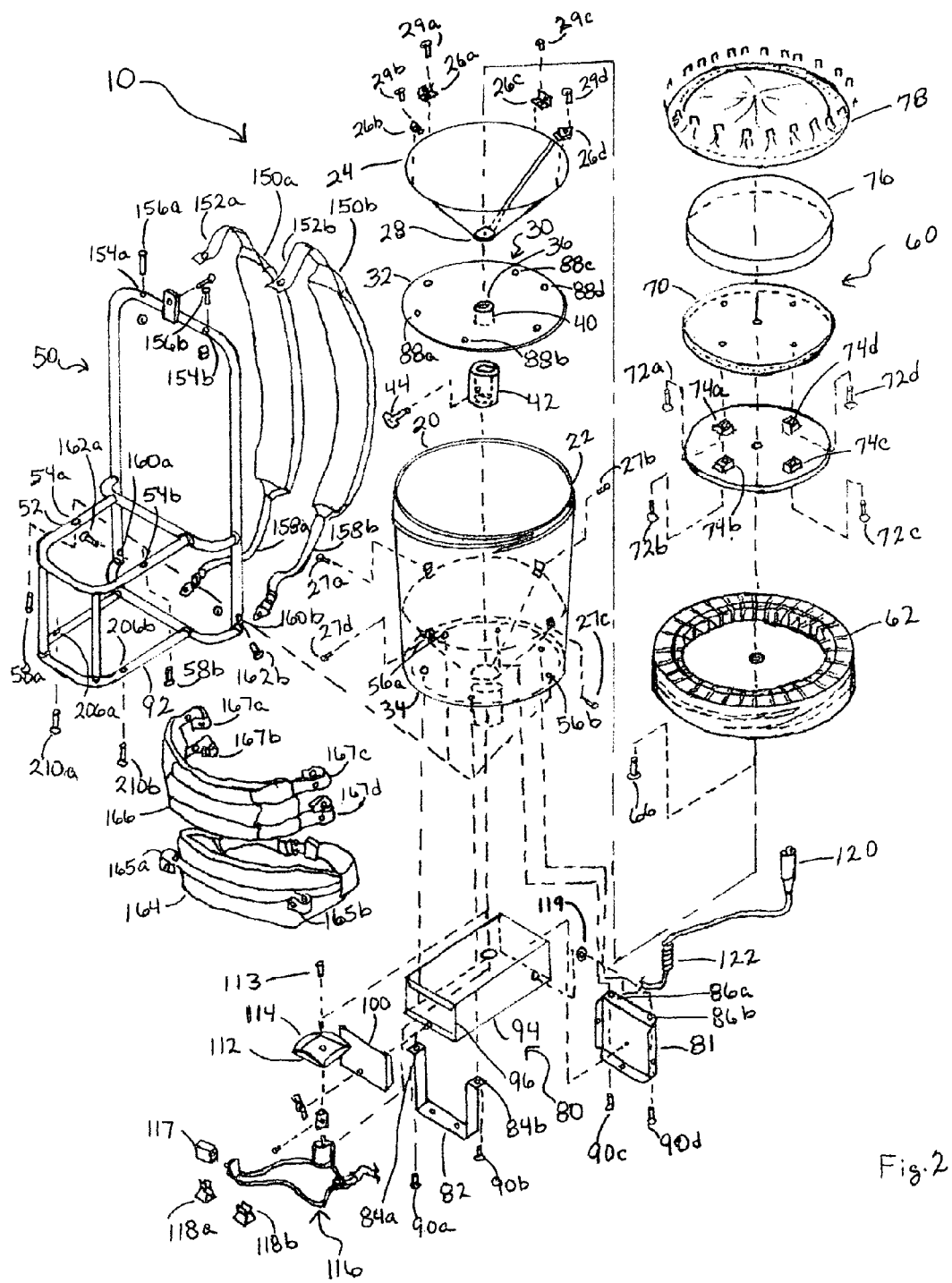
FIG. 2 is an exploded of an exemplary embodiment of the present invention.
Figure 5:
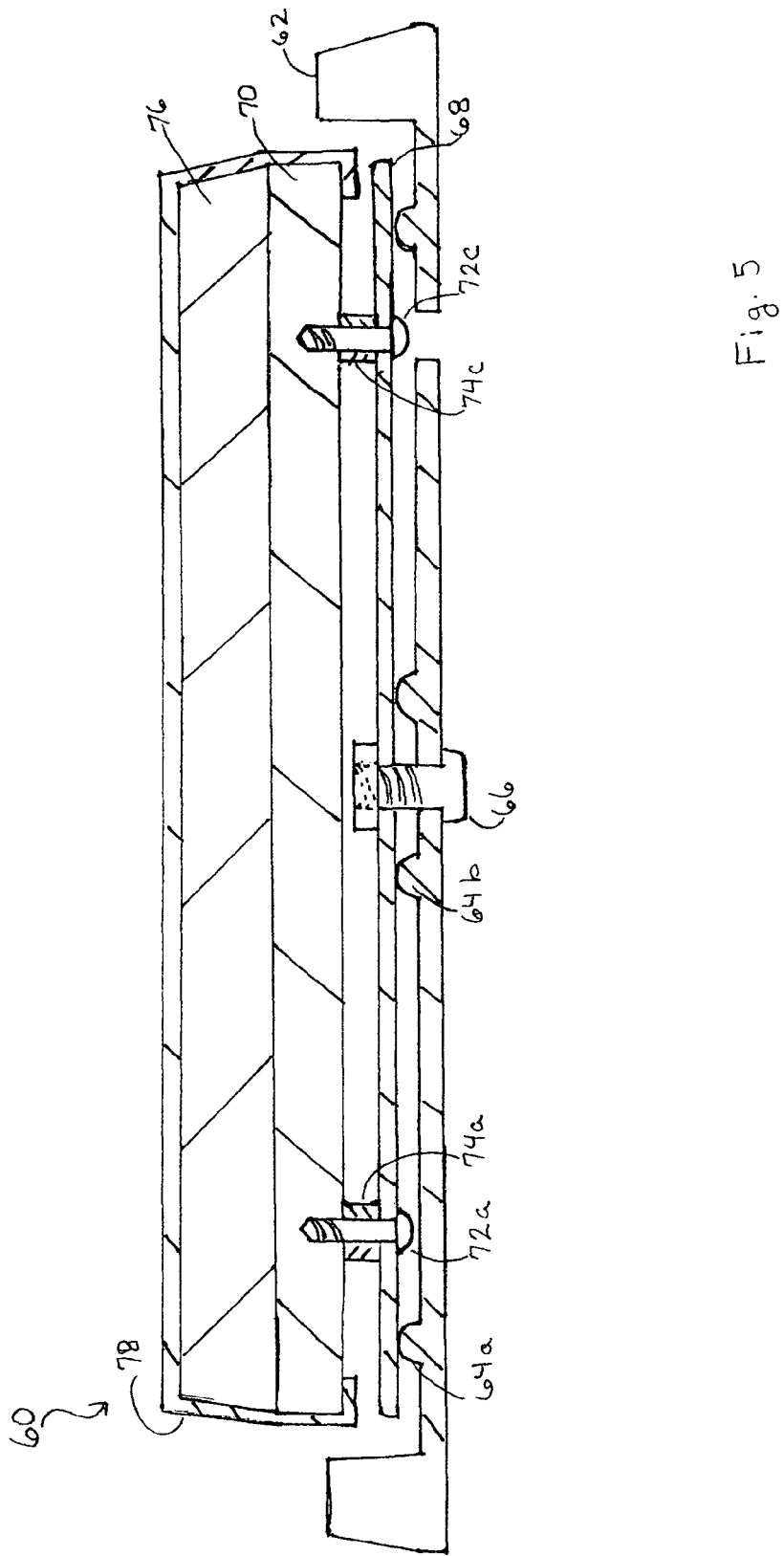
FIG. 5 is a sectional view across the middle of the lid assembly in an exemplary embodiment of the present invention.

Additionally, for the exemplary embodiment of FIG. 1 and FIG. 2, a frame 50 is provided having a platform section 52 with holes 54a-b aligning with holes 56a-b in the plate 32 for attachment using screws 58a-b, the frame platform section thus supporting and securing the bucket 20. Granular material within the bucket is protected by a multi-component lid assembly 60 that threadably attaches to the bucket threaded top 22. As further shown in FIG. 5, the lid assembly 60 has a bottom portion 62 that threadably attaches to the bucket 20. The lid bottom portion has concentric elevations 64a-b about its center. A center bolt and nut combination 66 fastens a second portion 68, which is constructed of aluminum. A third portion 70, constructed from plywood, is attached to the second portion using four screws 72a-d, and spaced from the second portion using nylon spacers 74a-d. A fourth portion 76, constructed from foam is positioned on the third portion 70 as a seat cushion, and is held in place by a camouflaged fabric cover 78, which surrounds the fourth portion and is stapled to the third portion. In use, the seat may be swiveled about the center bolt and nut combination 66, the aluminum third portion 70 sliding easily on the first portion elevations 64a-b.

Figure 6:
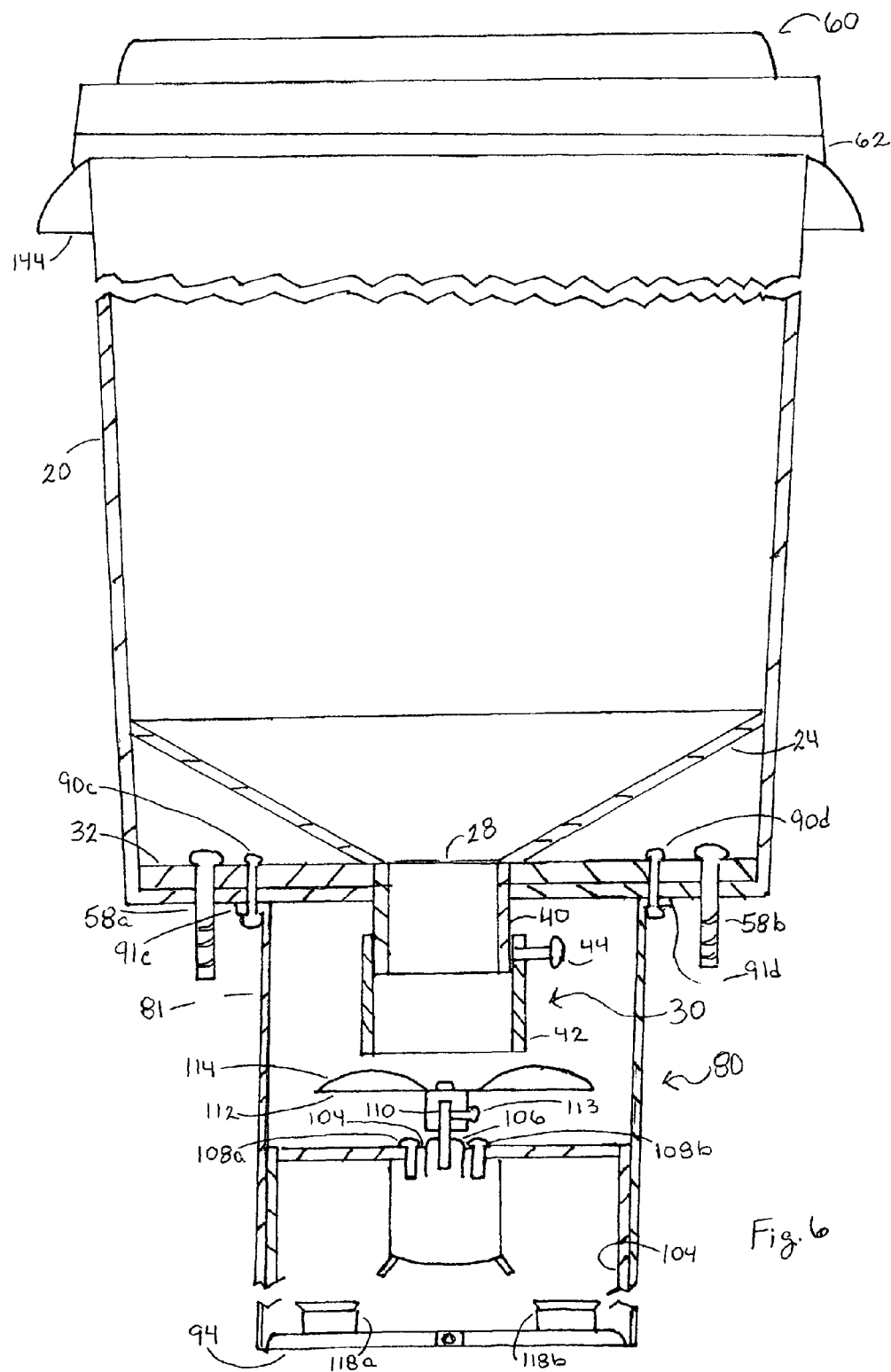
FIG. 6 is a partial sectional view of an exemplary embodiment of the present invention cut laterally across the middle of the bucket and downspout assembly.
Figure 7:
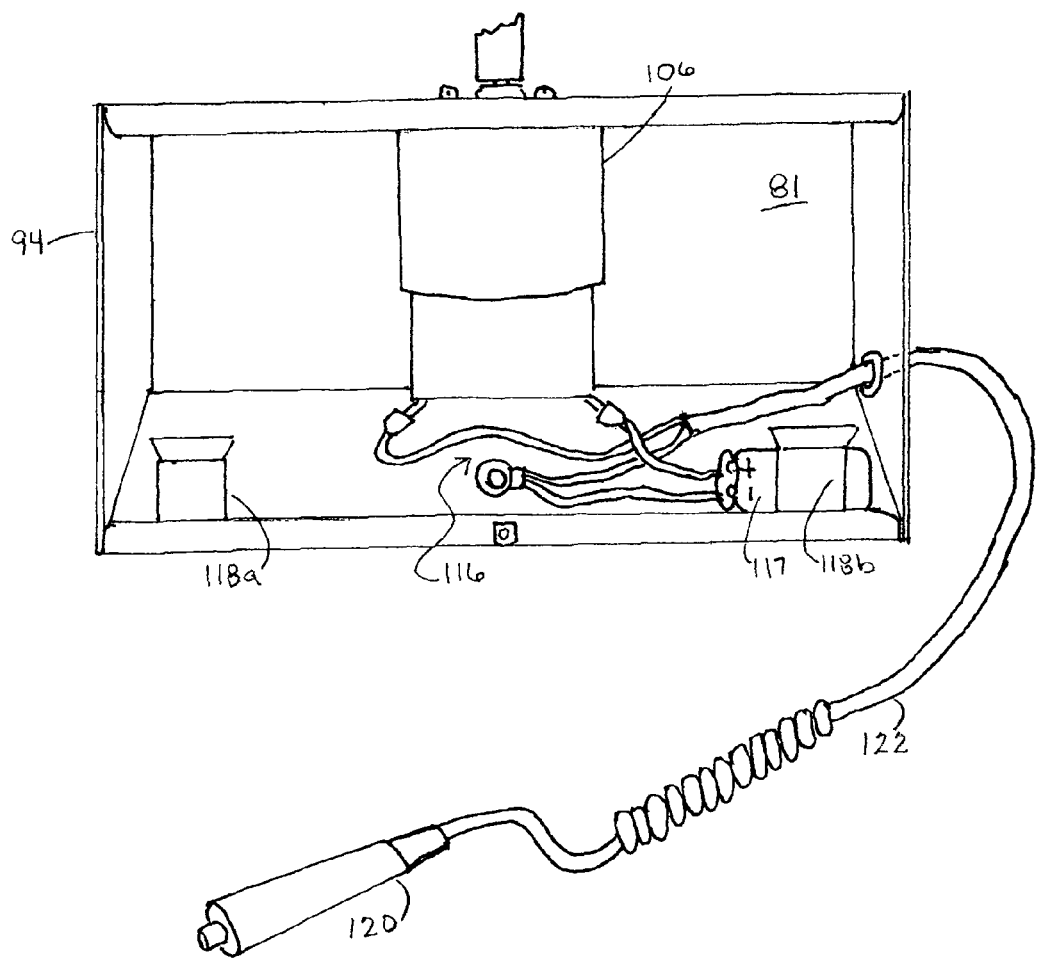
FIG. 7 is a partial front view of the spreader assembly of an exemplary embodiment of the present invention.

Further, the exemplary embodiment illustrated in FIG. 1 and FIG. 2 provides a spreader assembly 80, which is attached to the plate 32 using bracket 82 and back plate 81 which have holes 84a-b and 86a-b, respectively. As shown in combination with partial section FIG. 6, the holes 84a-b and 86a-b align with holes 88a-d in the plate 32 and receiving screws 90a-d for attachment using nuts 91c-d (two not shown) such that the spreader assembly is contained within a frame 50 enclosure 92 in such a manner that the frame enclosure extends lower than the spreader assembly. The spreader assembly includes a box 94 attached to back plate 81 and positioned within the spreader assembly bracket 82, the box having an openable end 96, the end being openable by the removal of cap 100. As shown in further detail in FIG. 6, the box 94 has an opening 104 through which a motor 106 within the box partially protrudes, the motor being attached to the box using screws 108a-b. A shaft 110 rotates when the motor is activated, and is attached to a spreader plate 112, the spreader plate being attached to the shaft using screw 113, the spreader plate having deflector blades 114. The rotating shaft drives the spreader plate into rotation with the motor. As shown in additional detail in FIG. 7, the motor receives power through conventional wiring 116 that connects the motor to a 9-volt battery 117 positionable in either of brackets 118a-b, the battery brackets being within and attached to the box 94. A hand-operated push button actuator 120 has a coiled cord 122 that extends through the box, through rubber grommet 119, and is wired to the motor 106. By holding the button down, the user causes the motor to run, thus turning the spreader plate 112, and dispersing granular material, the back plate 81 serving as a deflector to deflect the dispersed material from the user.

Figure 8:
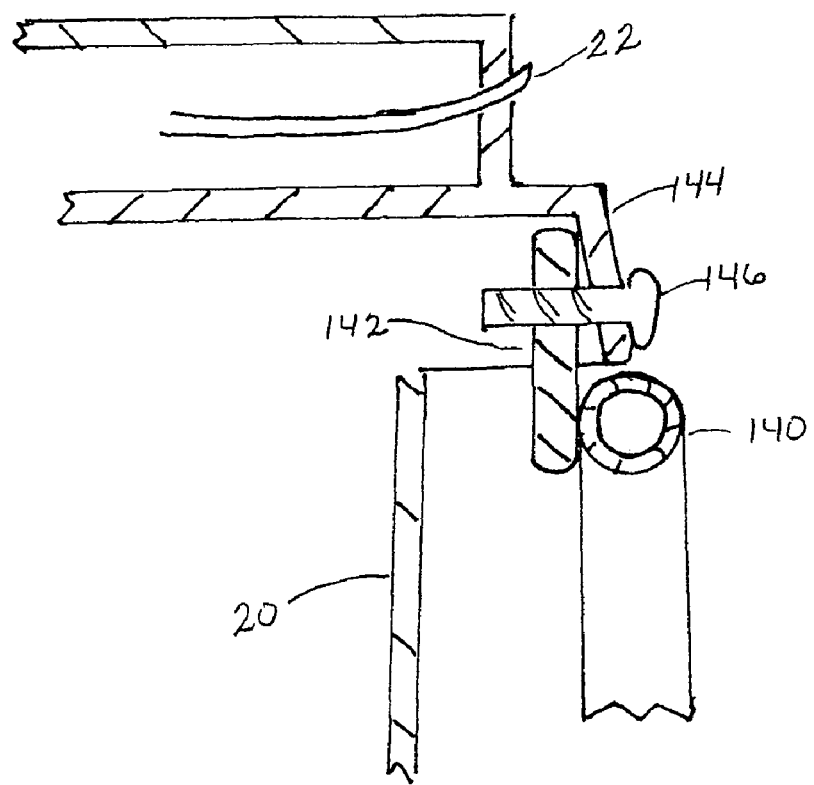
FIG. 8 is a sectional partial view of the frame brace and bucket in an exemplary embodiment of the present invention.

Additionally, FIGS. 1 and 2 show the frame 50 of the exemplary embodiment 10 to include a vertical brace member 140 to which the frame platform 52 and frame enclosure 92 are attached. An aluminum top attachment member 142 is attached to the top center of the brace member and is joined to bucket 20 handle structure 144 using a screw 146 which threadably attaches to a threaded hole in the top attachment member 142, as shown in FIG. 8. Padded backpack straps 150a-b, adjustable in length, have first ends 152a-b, and are removably attached to brace member holes 154a-b using clevis pin-circle cotter combinations 156a-b, as shown in additional detail in FIG. 9 for the right shoulder strap 150b. Similarly, the straps have second ends 158a-b attached to brace member holes 160a-b using clevis pin-circle cotter combinations 162a-b. Also, an adjustable padded and buckled waist strap 164 is attached, using snaps 165a-b to the brace member. A padded lower back cushion 166 is also provided and attached to the brace member 140 using snaps 167a-d, along with a padded and a padded neck cushion 168. In some exemplary embodiments the push button actuator 120 is removably attached to the frame brace 140 using a hook-and-pile fastener 123, as shown in FIG. 1.

Figure 10:
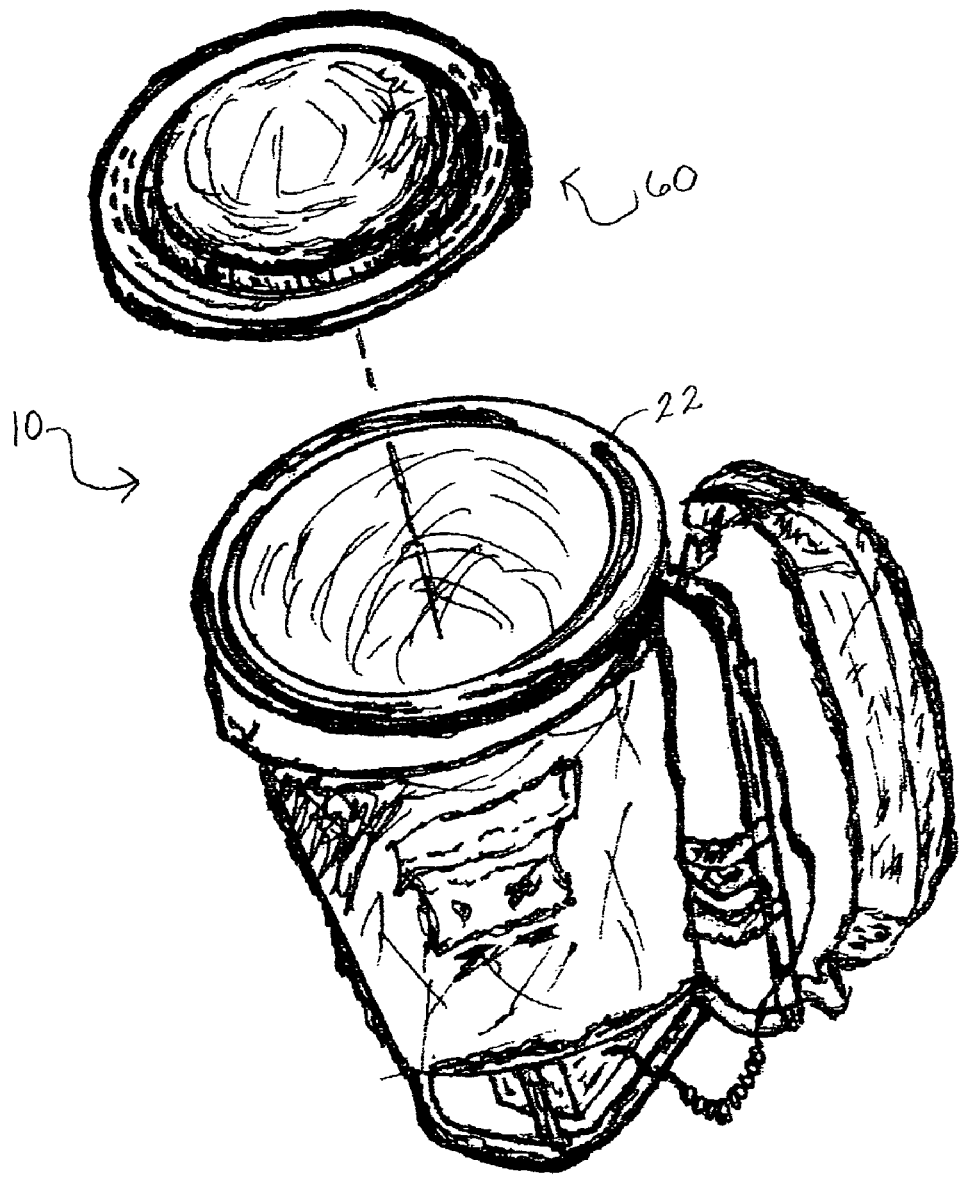
FIG. 10 is a perspective of an exemplary embodiment of the present invention with the lid assembly removed.
Figure 11:
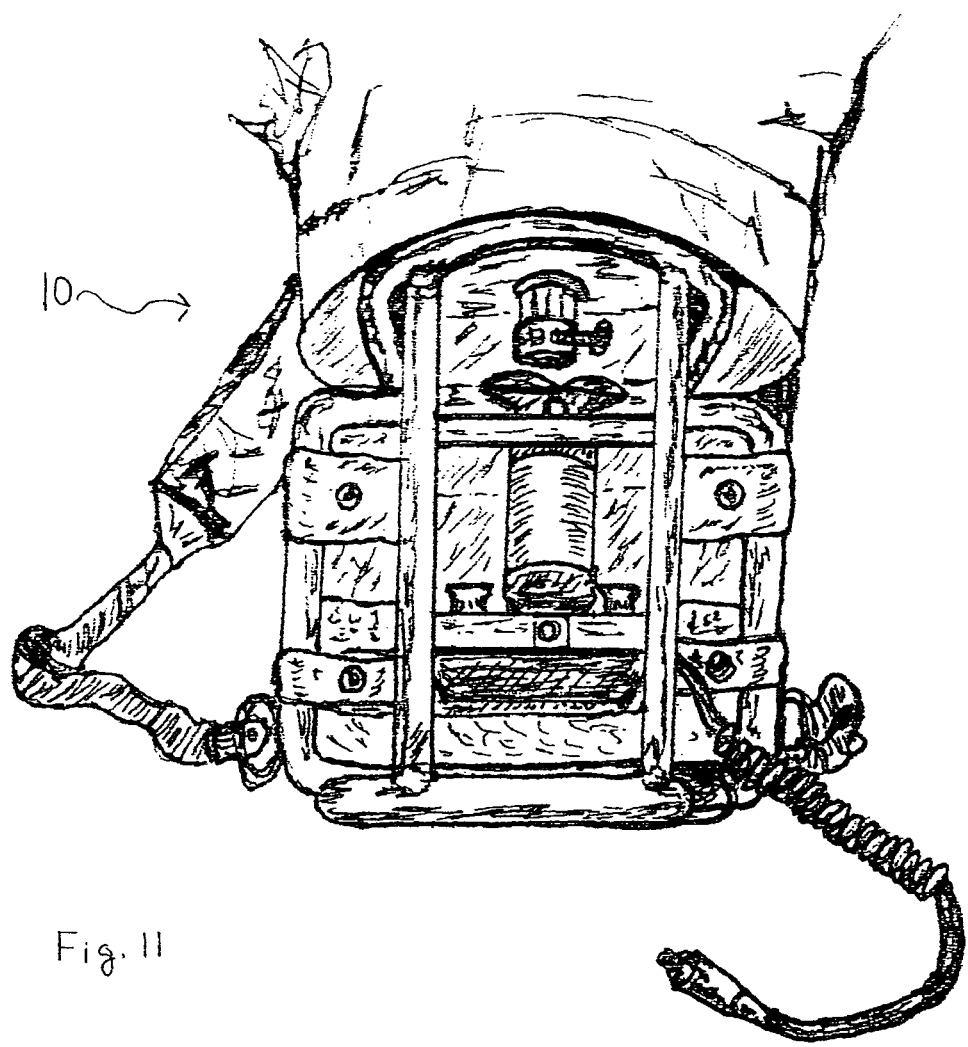
FIG. 11 is a front view of an exemplary embodiment of the present invention.

Additional views of the exemplary embodiment of FIG. 1 are provided in FIG. 10 and FIG. 11.

Figure 12:
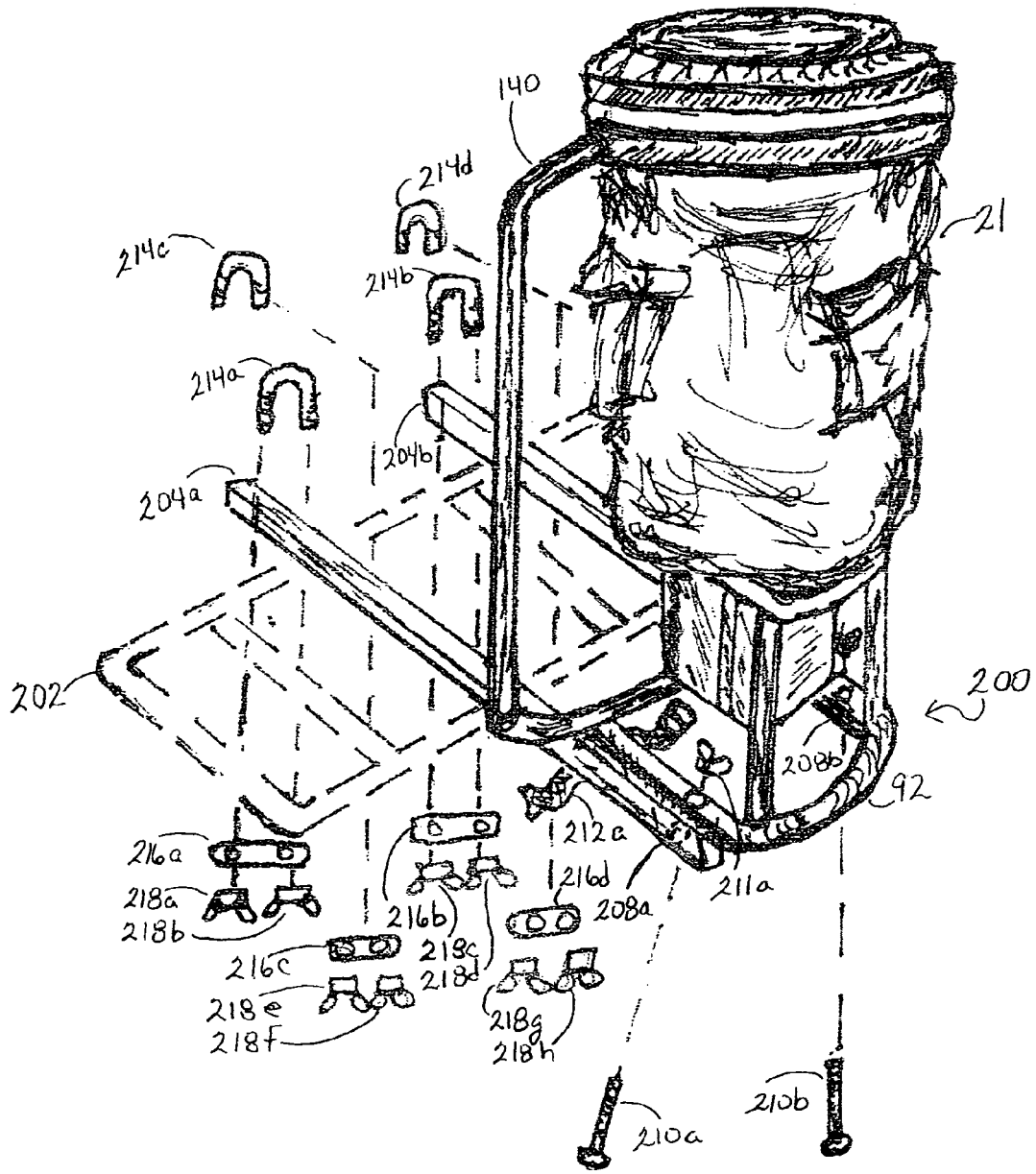
FIG. 12 is an exploded view of a vehicle rear structure attachment assembly in an exemplary embodiment of the present invention.

Turning now to FIG. 12, an exemplary embodiment of the present invention is shown to provide an all terrain vehicle attachment assembly 200 for supporting the device 10 on an all terrain vehicle, having a rear structure, e.g. a rack 202 made of tubular steel. The attachment assembly provides two rigid, elongated members 204a-b, each having a hole 208a-b, which aligns with a hole 206a-b in the frame enclosure 52 and attached with screws 210a-b and wing nuts 211a (one shown). Each member 204a-b also has a buckle strap 212a (one shown) positioned on each member for wrapping about the frame enclosure and further attaching the frame enclosure to the member. [In some exemplary embodiments the strap uses a hook and pile fastener.] The attachment assembly further provides clamps having U-bolts 214a-d a U-bolt closing member 216a-d, and a pair of wing nuts 218a-h, for completing the clamping of the elongated members 204a-b to portions of the rack 202. In the exemplary embodiment of FIG. 12, the elongated members are of a length such that the frame and bucket are in a position completely behind the rear structure.

Figure 13:
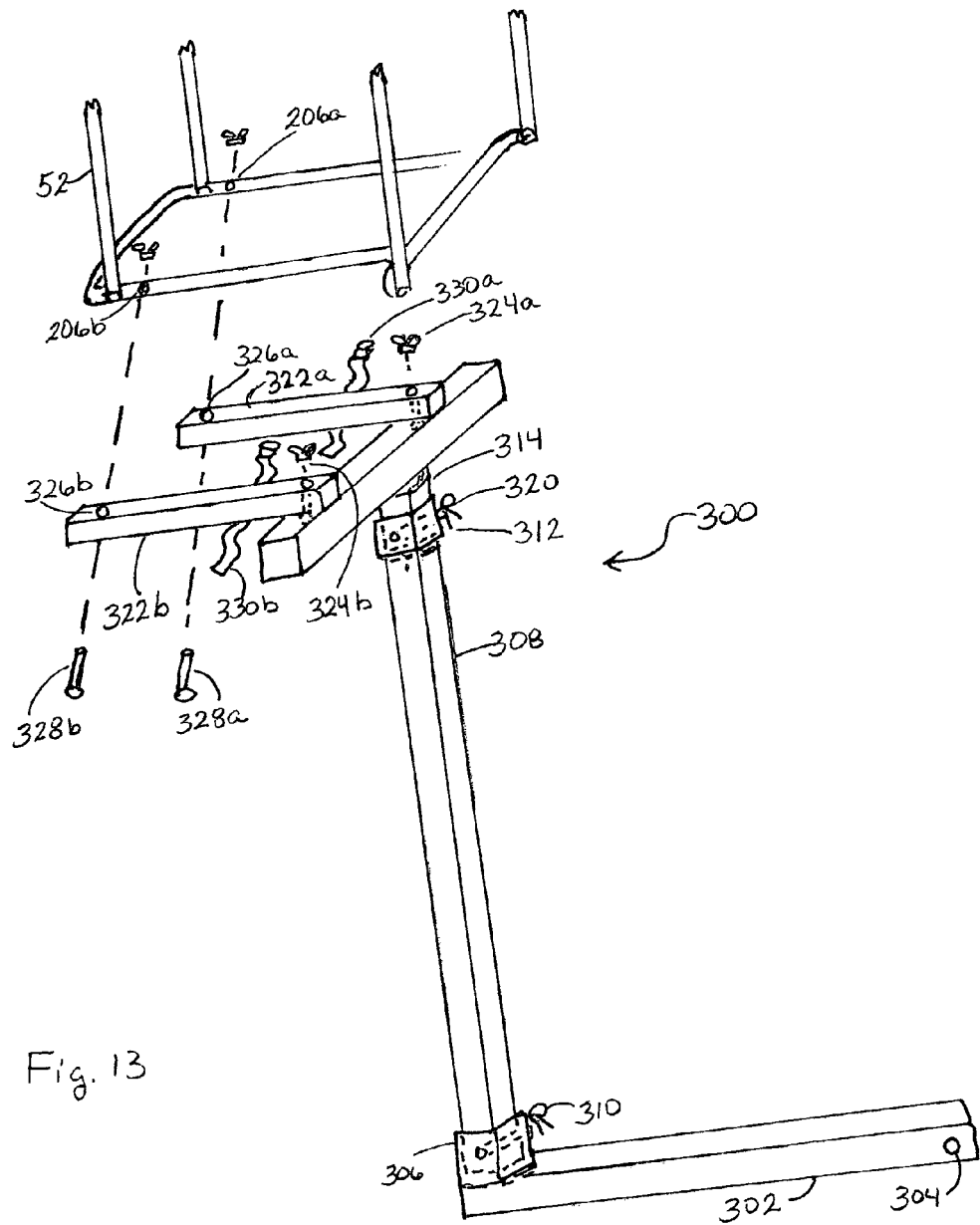
FIG. 13 is a perspective view of a vehicle rear structure attachment assembly in an exemplary embodiment of the present invention.

Turning now to FIG. 13, whereby an exemplary embodiment of the present invention is illustrated and shown to include an attachment assembly 300 for use with a vehicle that has rear structure in the form of a conventional receiver hitch having an opening for receiving a square-shaped member with a hole, the hitch having a hole for inserting a pin through the hitch and the square-shaped member hole to secure the square-shaped member. In the exemplary embodiment of FIG. 13, the attachment assembly includes an insertion member having a square-shaped first member 302 with a hole 304 such that the pin is insertable through the hitch and first member hole, thus securing the first member in the hitch. The first member extends rearwardly from the vehicle and at its end has an upwardly facing member 306 for receiving a second square-shaped member 308 and securing the second member using a clevis pin and cotter combination 310. The second member extends upwardly and has at its end an upwardly facing member 312 for receiving the vertical end 314 of a welded tee 316 and securing the welded tee using a clevis pin and cotter combination 320. Two elongated members 322a-b are attached to the welded tee using bolt and wing nut combinations 324a-b. The elongated members have holes 326a-b that align with frame enclosure holes 206a-b and are attached to the frame enclosure 52 using bolt and wing nut combinations 328a-b. Each elongated member 322a-b also has a buckle strap 330a-b for additional securement of the elongated members to the frame enclosure 52. [In some exemplary embodiments the strap uses a hook and pile fastener.] In some exemplary embodiments, the first member 302, second member 308, and welded tee 316 are two inch square steel tubing, and the upwardly facing receiving members 306,312 are two and one/half inch square steel tubing.

In some exemplary embodiments the first member 302 extends rearwardly to a length that allows the upwardly extending second member 308 to clear a typical pickup tailgate in its lowered position, or the rear rack on an all terrain vehicle.

Figure 14:
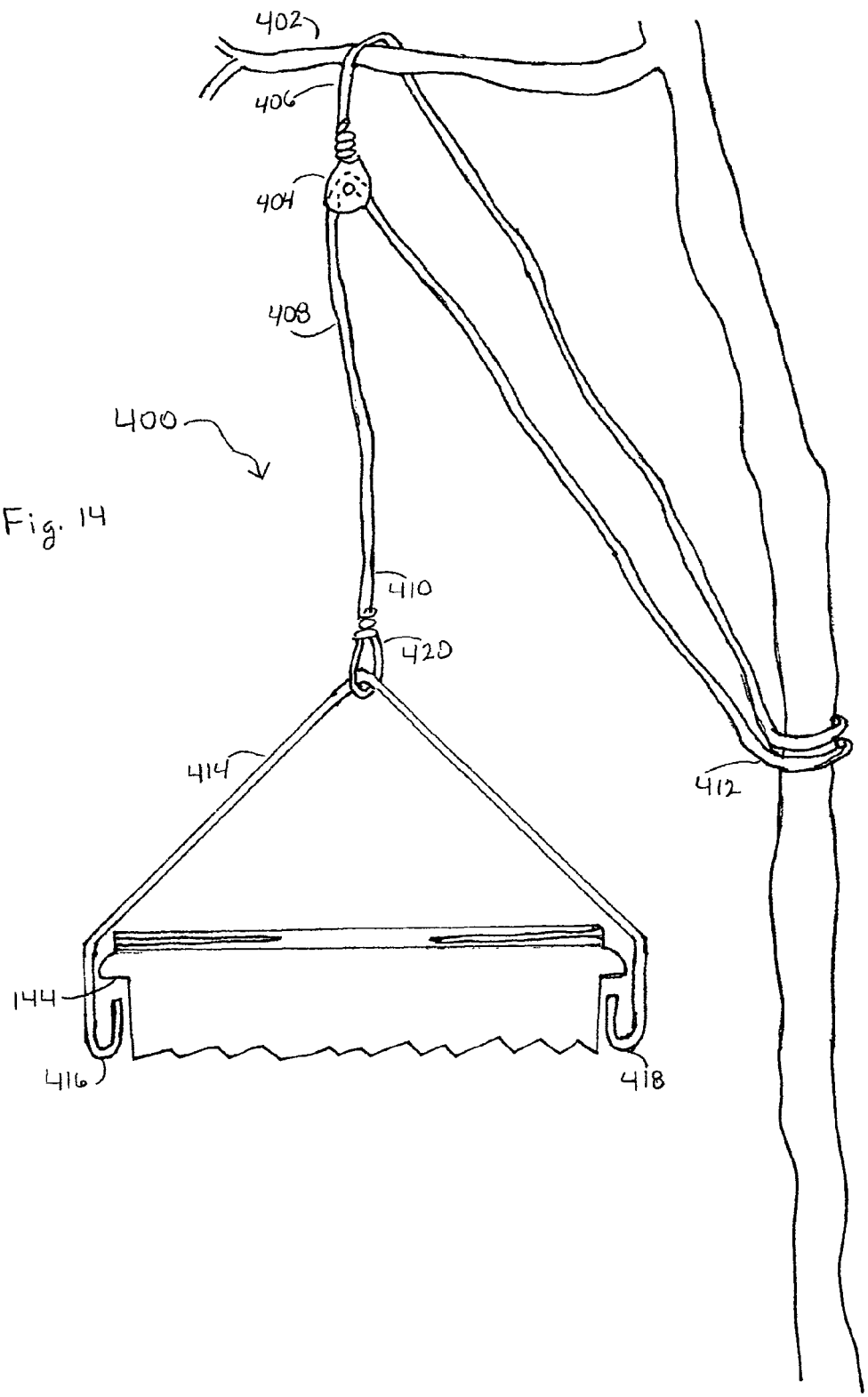
FIG. 14 is a side view of a suspension assembly in an exemplary embodiment of the present invention.

Turning now to FIG. 14, an exemplary embodiment of the present invention is shown to include a suspension assembly 400 for suspending the device, above the ground, from an elevated object, e.g. a tree limb 402. The suspension assembly has a conventional pulley 404 and a securing device 406, (e.g. a length of rope) for hanging the pulley on the elevated object, a rope 408 having a first end 410 and a second end 412, the rope being positioned for travel through the pulley, a hanger 414 having at least two end members 416,418, the end members being configured to engage the bucket handle structure 144 when the hanger moves vertically, and a hanger securing device 420 positioned on the rope first end for attaching the rope to the hanger, such that the user, when pulling on the rope second end, causes the hanger securing device to lift the hanger, the hanger end members engaging the bucket handle structure such that the device is elevated. When the device is at the desired height, the user ties the rope second end to a suitable object.

Figure 15:
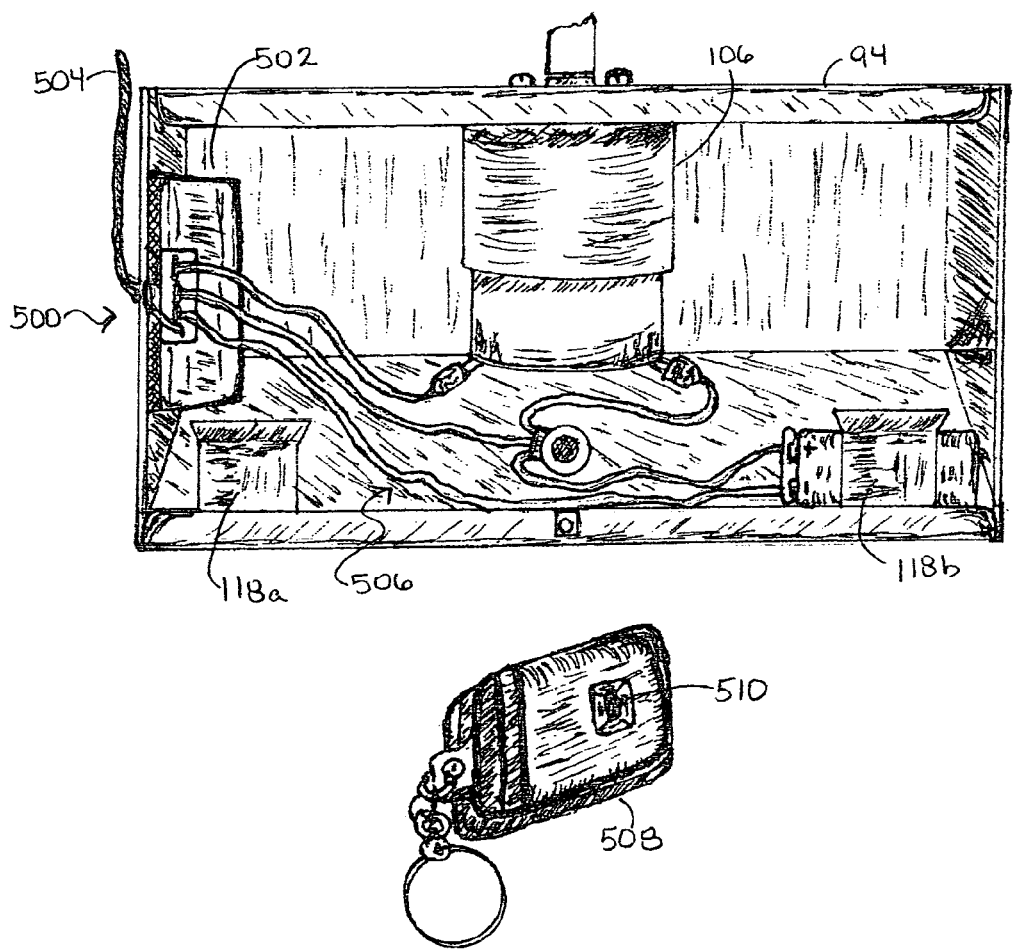
FIG. 15 is a partial front view of a spreader assembly in an exemplary embodiment of the present invention.

Turning now to FIG. 15. In some exemplary embodiments, the wired remote actuator 120 and coiled wire 122, and related conventional wiring 116, are replaced with a wireless remote actuator assembly 500, having a receiver 502, antenna 504, conventional wiring 506, and a wireless handheld actuator 508, having a button 510. By pressing and releasing the button, the user causes the motor 106 to run, thus turning the spreader plate 112. A second press and release turns the motor off.

Figure 16:
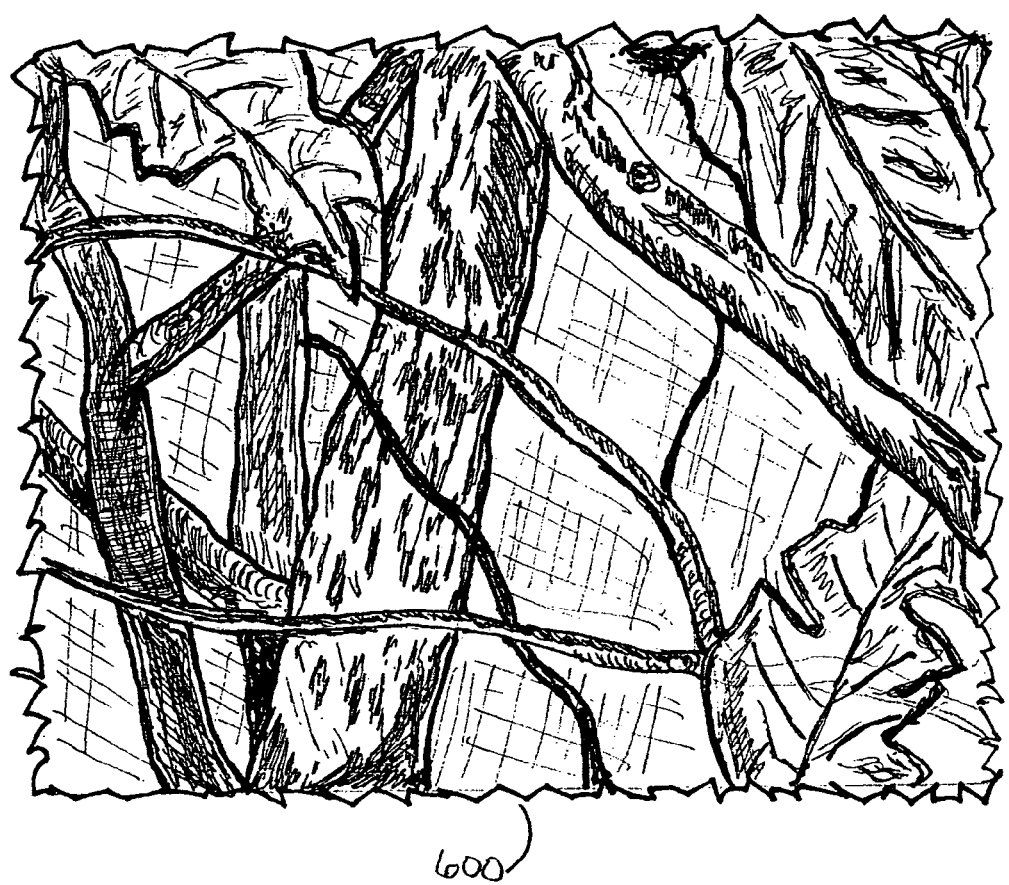
FIG. 16 is a plan view of a portion the camouflaged fabric.

Some exemplary embodiments include aluminum tubing for the frame 50, a plastic bucket 20, urethane foam for cushions in the belt 164, lower back cushion 166, and backpack shoulder straps 150a-b, a aluminum plate 32, an aluminum funnel 24, box 94, support bracket 82, back plate 81, and battery brackets 118a-b, and an aluminum first conduit 40 and second conduit 42. Some exemplary embodiments include 600d polyester weather resistant urethane 2-pass for the camouflaged fabric portions, e.g. the bucket cover 21, seat cushion cover 78, and the covers for straps 150a-b, neck cushion 168, lower back cushion 166, and the cushion in the padded waist belt 164, a representative camouflaged portion 600 being illustrated in FIG. 16. Some exemplary embodiments include urethane foam for cushions and pads. Some exemplary embodiments include a 3950 rpm 12V DC high-torque (1360 gm-cm) motor 106 with a ¼ inch flat, ⅛ inch diameter stainless steel shaft. Some exemplary embodiments include a 315 MHz frequency, fixed code transmitter 508, compatible with a 3-13.8 VDC, 5 mA standby, 15 mA LED flashing at 12 VDC receiver 502. Some exemplary embodiments include a bucket capacity of approximately five gallons (0.0189 cubic meters).

In the use of some exemplary embodiments, the user arrives at the site onto which the user desires to spread a granular material, e.g. feed. For sites inaccessible by vehicle, the user will use the device as a backpack, such that the feed may be dispersed behind the user while walking. The user first removes the lid assembly 60, pours the desired amount of feed into the bucket 20, and replaces the lid assembly. The second conduit 42 of the downspout assembly 30 has been previously positioned to a setting whereby the lower end of the second conduit is close enough to the spreader plate 112 that the feed will be retained on the plate and within the second conduit, thus discharge of feed from the bucket is stopped. The user then adjusts the shoulder straps 150a-b and dons the device as a backpack. Once on the user's shoulders the user fastens the padded belt about the waist and adjusts the belt such that some of the weight is borne by the waist rather than the shoulders. When the user walks and reaches the terrain upon which it is desired to disperse the feed, the user detaches the remote push-button hand control 120 from its hook and pile attachment 123 to the frame brace 140. When the user pushes the button the circuit is completed in the conventional wiring 116, such that the motor 106 is activated, and the motor shaft 110 rotates the spreader plate 112. The spinning spreader plate, acting through the deflector blades 114, now actively propels the feed from the spreader plate behind the user as the user is walking, for so long as the user is pushing the button. When the user reaches a terrain where feed is not needed, or stops for a rest, the user releases the button, the motor stops, the spreader plate stops, and the feed ceases being discharged from the bucket through the downspout assembly.

If, during the course of the walk, the user determines that feed should be dispersed at an increased rate, the user loosens the set screw 44, raises the second conduit with respect to the first conduit, and tightens the set screw. The increased spacing between the second conduit lower end and the spreader plate will allow feed to be discharged from the bucket at a higher rate.

During a rest break or for hunting, the user removes the device from the user's shoulders and sets the device down on the frame 50. The frame height is such that the seat portion 70,76,78 of the lid assembly 60 is at an appropriate height for the user to sit down on the seat portion. For the user's comfort the seat is cushioned and swivels.

In an additional use of some exemplary embodiments, the user with a vehicle, such as an all terrain vehicle with a rear rack, quickly configures the device for an attachment to the rear rack. The shoulder straps, for access convenience, are removed by pulling the circular cotters from the clevis pins 156a-b,162a-b, and the waist belt 164 and lower back cushion 166 are unsnapped 165a-b,167a-b and removed. The attachment assembly 200 has two elongated aluminum members 204a-b that are positioned on the rear rack, and attached using the U-bolt brackets 214a-d. The aluminum members are movable fore or aft before tightening the brackets, depending on how close to the front of the rear rack the user wants the device to be placed. (The farther aft the device is placed, the less feed will contact the all terrain vehicle while being dispersed.) Once the brackets are tightened the device is placed on the elongated steel members until frame enclosure holes 206a-b align with holes 208a-b on the elongated members, and bolt and wing nut combinations 210a-b are utilized to attach the frame to the elongated members. Then buckle straps 212a on the elongated members are connected and tightened for additional attachment of the frame to the elongated members. Exemplary embodiments including the wireless hand held actuator 508 are particularly useful when the device is attached to the all terrain vehicle, because a single push of the actuator button starts the motor 106 and the motor stays running until the button is pushed a second time, allowing hands to be free as the vehicle moves and the spreader plate is spinning.

In an additional use of some exemplary embodiments, the user desires to utilize the hitch receiver on a pickup to position the device. The user assembles the attachment assembly 300, by inserting the first member 302 into the pickup's hitch receiver and securing it with a pin through a hole 304 in the first member. The user then inserts the second member 308 into the upward-facing portion 306 of the first member and secures it using the clevis pin and cotter combination 310. The user then inserts the vertical portion 314 of a welded tee 316 into an upward-facing portion of the second member 312 and secures the joinder using the clevis pin and cotter combination 320. Two steel elongated members are then attached by the user to the welded tee using bolts affixed to the welded tee and then secured with wing nuts 324a-b. Holes 326a-b in the elongated members are aligned with holes 206a-b in the frame enclosure 52, and bolt and wing nut combinations 328a-b are used to attach the frame to the elongated members. Once the wing nuts are tightened buckle straps 330a-b on the elongated members are fastened and tightened about the frame. In the remote areas where the user is likely to desire to spread feed, a person in the back of the pickup can reach the wired handheld control 120 to activate the spreader assembly, or in exemplary embodiments with the wireless handheld control 508, the driver can activate the spreader assembly from the passenger compartment of the pickup. The user is able to operate with the tailgate down, in that the first member extends rearwardly a sufficient distance for the second member to clear the back edge of the tailgate.

Should the user desire a stationary feed spreader, the device is readily adaptable from the backpack configuration to the stationary configuration using a suspension assembly 400, where the user hangs a pulley 404 from an elevated object such as a tree limb 402, using a length of rope 406 which is tied off on the tree trunk. A second length of rope 408 is run through the pulley and hooked to a hanger 414 using a clip 420 on the first end 410 of the rope. The hanger is positioned such that its hooks 416 and 418 are beneath the bucket handle structure 144. When the user pulls on the rope second end 412 the hooks engage the handle structure and the device is pulled from the ground to an acceptable height, and the user ties off the rope second end to the tree trunk. Using the wireless remote handheld actuator 508, the user initiates the spreader assembly for the desired amount of time by pushing the button, then pushing the button again at the end of the desired time.

With respect to the above description then, it is to be realized that the optimum apparatus for a particular application or use of the device, will include various material and size adjustments, and will include alterations in the shape and direction of the members of the attachment assemblies, which will occur to those skilled in the art upon review of the present disclosure.

All equivalent relationships to those illustrated in the drawings and described in the specification are intended to be encompassed by the present invention.

The descriptions in this specification are for purposes of illustration only and are not to be construed in a limiting sense.

I claim:

1. An apparatus for a user to disperse granular material, comprising:
   a bucket for receiving and storing the granular material, the bucket having a bottom, the bucket bottom having a hole through which granular material is gravity discharged;
   a downspout assembly cooperating with the bucket, for directing the granular material discharged from the bucket, the downspout assembly having a conduit, the conduit having a lower end;
   a spreader assembly attached to the bucket, the spreader assembly having a spreader plate positioned to receive granular material from the downspout assembly conduit lower end, a motor configured to receive power from an electric power source, a power source positioning member, a driving member connecting the motor and the spreader plate, and an actuator, for activating and de-activating the motor such that the activated motor rotates the spreader plate and granular material is dispersed, the downspout assembly conduit lower end being spaceable with respect to the spreader plate;
   a frame having a platform for supporting the bucket and spreader assembly and;
   a harness for receiving and supporting the frame, the harness having straps such that the user supports upon the user's back;
   and further wherein the bucket has a conduit and the downspout assembly conduit is adjustable along a portion of their respective lengths such that the downspout assembly conduit lower end is positionable between at least a first and second vertical position.

2. The apparatus of claim 1, wherein the frame further comprises an enclosure, the enclosure substantially enclosing the spreader assembly.

3. The apparatus of claim 1, wherein the bucket has a removable lid for securing the stored granular material within the bucket.

4. The apparatus of claim 3, wherein the lid has a top member, the top member useable as a seat by the user, the frame serving as a support for the seat.

5. The apparatus of claim 4, wherein the top member is padded.

6. The apparatus of claim 4, wherein the top member swivels with respect to the lid.

7. The apparatus of claim 4, wherein the frame is sized such that the lid top member is spaced between two and three feet from the ground, when the frame rests upon the ground.

8. The apparatus of claim 1, wherein the actuator is remotely utilized by the user.

9. The apparatus of claim 8, wherein the actuator further comprises a hand control and an electric cord connecting the hand control to the motor.

10. The apparatus of claim 1, wherein the harness further comprises a belt member, the belt member being attached to the frame brace such that the user may secure the belt member about the user's waist.

11. The apparatus of claim 1, wherein the frame brace member has a padded member placed on the frame such that the padded support is proximate the user's neck.

12. The apparatus of claim 1, wherein the frame brace member has a padded member placed on the frame such that the padded support is proximate the user's lower back.

13. The apparatus of claim 1, wherein the frame is configured and sized such that the height of the frame is less than 36 inches.

14. The apparatus of claim 1, wherein the frame is configured and sized such that the width of the frame is less than 25 inches.

15. The apparatus of claim 1, wherein the frame is configured and sized such that the depth of the frame is less than 25 inches.

16. The apparatus of claim 1, wherein the harness is constructed from weather-resistant material.

17. The apparatus of claim 1, wherein the harness is constructed from camouflaged material.

18. An apparatus for a user to disperse granular material, comprising:
   a bucket for receiving and storing the granular material, the bucket having a bottom, the bucket bottom having a hole through which granular material is gravity discharged;
   a downspout assembly cooperating with the bucket, for directing the granular material discharged from the bucket, the downspout assembly having a conduit, the conduit having a lower end positionable between first and second vertical positions;
   a spreader assembly attached to the bucket, the spreader assembly having a spreader plate positioned to receive granular material from the downspout assembly conduit lower end, a motor configured to receive power from an electric power source, a power source positioning member, a driving member connecting the motor and the spreader plate, and an actuator, for activating and de-activating the motor such that the activated motor rotates the spreader plate and granular material is dispersed, the downspout assembly conduit lower end being spaceable with respect to the spreader plate;
   a frame having a platform for supporting the bucket and spreader assembly; and
   a harness for receiving and supporting the frame, the harness having straps such that the user supports the apparatus upon the user's back;
   and further wherein the actuator is remotely utilized by the user, the actuator further comprising a hand control and an electric cord connecting the hand control to the motor.

19. An apparatus for a user to disperse granular material, comprising:

a bucket for receiving and storing the granular material, the bucket having a bottom, the bucket bottom having a hole through which granular material is gravity discharged, the bucket further having a removable lid for securing the stored granular material within the bucket, the lid having a padded top member the top member being useable as a seat by the user, the frame serving as a support for the seat member, the top member swiveling with respect to the lid;

a downspout assembly, for directing the granular material discharged from the bucket, the downspout assembly further comprising a first conduit and a second conduit, the second conduit having a lower end, the first and second conduits being adjustable along a portion of their respective lengths such that the second conduit lower end is positionable at or between a first and second position;

a spreader assembly attached to the bucket, the spreader assembly having a spreader plate positioned to receive granular material from the downspout assembly second conduit lower end, a motor configured to receive power from an electric power source, a power source positioning member, a driving member connecting the motor and the spreader plate, and an actuator, operated by the user's hand, for activating and de-activating the motor such that the activated motor rotates the spreader plate and granular material is dispersed, the downspout assembly second conduit lower end being spaceable with respect to the spreader plate;

a frame having a platform for supporting the bucket, and a brace member, the frame being configured and sized such that the height of the frame is less than 36 inches, the frame brace member having a padded member placed on the frame brace member such that the padded support is proximate the user's lower back, the frame further comprising an enclosure, the enclosure substantially enclosing the spreader assembly; and a harness for receiving and supporting the frame, the harness having straps such that the user supports the apparatus upon the user's back, the harness further comprising a belt member, the belt member being attached to the frame brace such that the user may secure the belt member about the user's waist.

* * * * *